United States Patent [19]

Balken et al.

[11] Patent Number: 4,619,627
[45] Date of Patent: Oct. 28, 1986

[54] FLUIDIC SHAFT COUPLING ASSEMBLY

[75] Inventors: Jochen Balken, Lindau; Wolfgang Beigang, Siegburg; Bernhard Bihr, Neunkirchen, all of Fed. Rep. of Germany

[73] Assignee: Uni-Cardan Aktiengesellschaft, Siegburg, Fed. Rep. of Germany

[21] Appl. No.: 667,536

[22] Filed: Nov. 2, 1984

[30] Foreign Application Priority Data

Nov. 11, 1983 [DE] Fed. Rep. of Germany ....... 3340966

[51] Int. Cl.⁴ ............................ F16D 3/80; F16C 3/02
[52] U.S. Cl. ........................................ 464/24; 464/904
[58] Field of Search .............. 464/24, 27, 28, 180, 464/81, 85, 71, 904

[56] References Cited

U.S. PATENT DOCUMENTS 4,434,949  3/1984  Karr .................... 464/28 X

FOREIGN PATENT DOCUMENTS

| 23246 | 2/1981 | European Pat. Off. ........... 464/28 |
| 1132577 | 7/1962 | Fed. Rep. of Germany . |
| 2528774 | 1/1976 | Fed. Rep. of Germany . |
| 2717170 | 2/1978 | Fed. Rep. of Germany . |
| 2805831 | 5/1979 | Fed. Rep. of Germany . |
| 561811 | 6/1944 | United Kingdom ................. 464/24 |
| 917521 | 2/1963 | United Kingdom . |
| 1037433 | 7/1966 | United Kingdom . |
| 573635 | 9/1977 | U.S.S.R. ............................. 464/28 |
| 838146 | 6/1981 | U.S.S.R. ............................. 464/28 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

A shaft coupling assembly having a first and a second internal fluid chamber system, each containing therein a fluid medium which is placed under pressure when torque is transmitted through the coupling assembly, each of the fluid chamber systems including a plurality of chambers and a plurality of channels which converge from a common point placing the channels in flow communication with each other and which interconnect the plurality of chambers of each of the systems. The channels of the first and the second systems are axially offset relative to each other and each of the systems is designed to create a throttling effect offering resistance to flow of the fluid medium within each of the systems. The coupling assembly enables compensation for axial, radial, angular and/or torsional shaft offset and, additionally, makes it possible to damp the vibrations in an axial, radial, angular and torsional direction and to adjust the stiffness of the coupling assembly.

25 Claims, 17 Drawing Figures

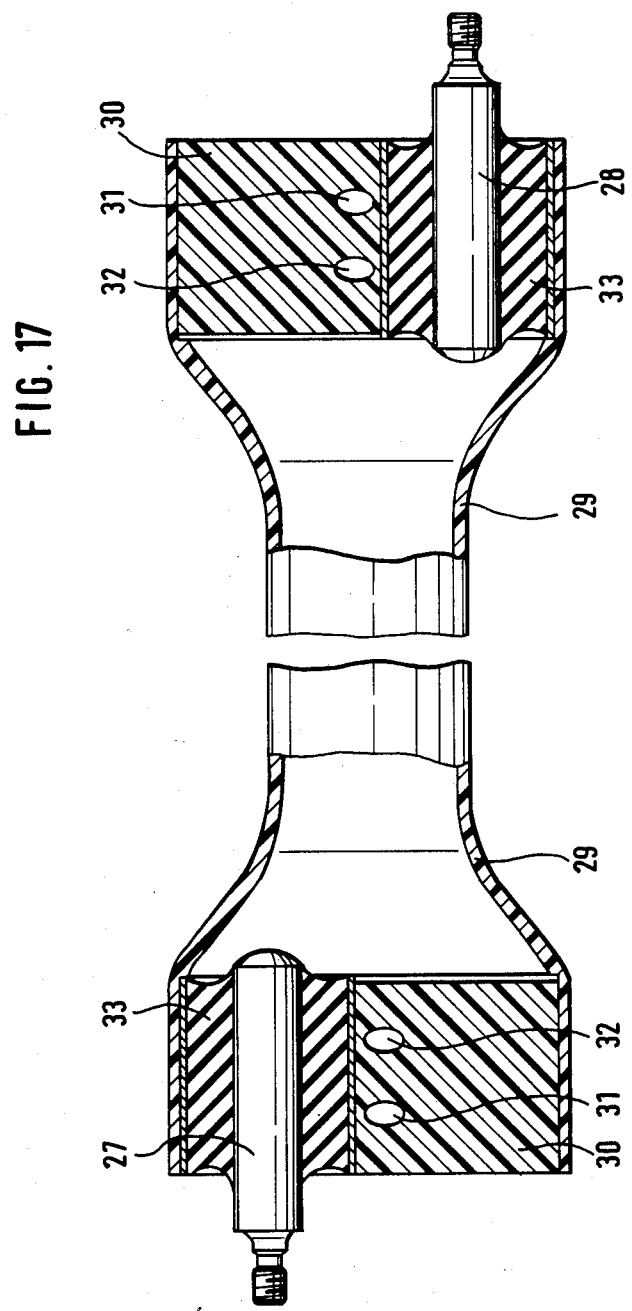

FLUIDIC SHAFT COUPLING ASSEMBLY

The present invention relates generally to torque transmitting coupling assemblies and more specifically to an elastic constant velocity shaft joint or coupling having a joint member formed with three or more recesses into which rubber-metal parts are firmly inserted in such a way that two separate chambers each are produced with channels in the joint member being provided for connecting the chambers. Assemblies to which the present invention relates include two hub members, one each being arranged at the input and output end of the torque transmitting assembly with one of the hub members being attached to the joint member and the other being attached to the rubber-metal parts or with both being alternately attached to the rubber-metal parts.

In the prior art, for example, DE-PS No. 28 05 831, there is disclosed an elastic shaft coupling of the type described in the case of which two chambers formed in each recess as well as adjoining chambers produced by different formed rubber-metal parts are interconnected by channels. When torque is transmitted, it is possible, admittedly, to exchange damping means between the chambers through these channels, but it is not possible to vary the stiffness of the coupling via the flow agent as it may escape under pressure and the circumferential forces are transmitted only through elastic deformation of the rubber elements. In view of the arrangement of the channels, there is no hydraulic pressure compensation (branching out of loads) between the pressure loaded chambers so that even production-related differences between the stiffnesses of the rubber elements cannot be compensated for.

DE-AS No. 11 32 577 discloses a hollow shaft drive for vehicles wherein torque is transmitted via freely positioned boots filled with liquid, with the boots adjoining the drive arms in one direction of rotation and the boots adjoining the drive arms in the other direction of rotation being interconnected. This design incorporating freely positioned boots is unsuitable for shaft joints requiring high speeds. Furthermore, the boots are connected via peripheral channels which do not permit a central control or throttling of the exchange of fluid.

Finally, British Patent Specification No. 917 521 discloses an elastic rotary coupling wherein the torque is also transmitted through boots filled with fluid. The boots loaded in one direction of rotation are connected to a gas-filled central chamber and the boots pressure loaded in the other direction of rotation are connected to another gas-filled chamber. This coupling has a complicated design. The fluid contained in the boots has no effect on the elasticity of the coupling as it is permitted to flow from the boots into the gas-filled chambers. The damping effect is slight and cannot be adjusted to the respective vibration system.

Accordingly, the present invention is intended to provide a homokinetic, elastic shaft joint coupling capable of compensating for an axial, radial, angular and/or torsional shaft offset. In addition, the shaft joint should make it possible to damp vibrations in an axial, radial, angular and torsional direction and to adjust the stiffness, i.e., the characteristic curve $M_d = f(\phi)$ ($M_d$=torque, $\phi$=angle of torsion) anywhere within limits. The overall object is that the joint should provide the possibility of optimum adjustment to the existing vibration system and in particular to the vibration behavior of a drive line. Finally, it is proposed to provide a propeller shaft which incorporates joints in accordance with the invention. Further advantages may be gathered from the following description.

SUMMARY OF THE INVENTION

Briefly, the present invention may be described as an elastic constant velocity torque transmitting coupling including: a first hub member defining a torque input end of said coupling, a second hub member defining a torque output end of said coupling, and a joint assembly elastically coupling said first and said second hub members for torque transmitting engagement, said joint assembly comprising means containing a fluid medium which is placed under pressure during torque transmission, said fluid medium containing means comprising: a first fluid chamber system including a first plurality of individual fluid chambers and a first plurality of channels connecting said first plurality of chambers in flow communication; a second fluid chamber system including a second plurality of individual fluid chambers and a second plurality of channels connecting said second plurality of channels in flow communication; said first and second plurality of channels being axially offset relative to each other and each extending outwardly from a first and a second common point, respectively, at which said first and second plurality of channels are connected, respectively, in flow communication; and throttling means in said first and second fluid chamber systems resisting the flow of fluid media therethrough.

With the shaft coupling in accordance with the invention, the chambers under pressure when transmitting torque are connected by the channels converging star-like in a first common meeting point, the chambers under tension when transmitting torque are connected by channels which are axially offset relative to the channels converging in the first meeting point and which converge in a second common meeting point, and the channels of the two chamber-channel systems essentially filled with a medium (e.g., a fluid) are designed at least partially as resistance means against the flow of media, e.g., the flow of fluid.

The shaft joint in accordance with the invention essentially permits stiffness and damping to be adjusted independently of each other. Thus, on the one hand, the joint stiffened considerably by being filled with incompressible fluid may be made softer by smaller inclusions of air. On the other hand, stiffness may be increased by pressurizing the fluid in the chamber-channel systems. As the two chamber-channel systems of the joint are independent of each other, the stiffness in the two directions of rotation may be adjusted differently by different fluid systems and/or pressures. If there is a radial shaft offset (radial vibrations), at least one chamber of each chamber-channel system is placed under an additional load, whereas, depending on the number of elements and the temporary position, the load on at least one other chamber is relieved.

As a result of this difference in pressure between the chambers, the fluid begins to flow which causes fluid vibrations in the systems. Differences in pressure between the chambers of a chamber-channel system also occur in the case of torque fluctuations. Furthermore, different thicknesses of the separating walls, differences in the Shore hardness values of the rubber material and different assembly angles of the formed rubber-metal parts lead to different stiffnesses of the springs. Under load, these differences in stiffness result in differences in pressure which, in turn, cause the fluid to flow.

These fluid flows which occur between the chambers of the two chamber-channel systems when the magnitude or direction of load changes are used for damping rotational, radial and bending vibrations of the driveline. These vibrations are dampened deliberately by the flow losses and pressure drops in the channels or in their resistance or throttling means.

In addition, there are whirling losses in the chambers themselves. By selecting a suitable resistance to the fluid columns vibrating in the channels, a damping effect which is independent of the frequency and amplitude and which occurs in addition to the material damping of the rubber may be achieved.

A further advantage of the joint in accordance with the invention is the compensation of pressure between the chambers resulting from the hydraulic connection of the chambers and, in the case of an offset, ensures identical loads on all spring elements. Therefore, there exists a compensation of load. In the case of a Giubo coupling with six segments, for example, the torque, in the case of radial offset, is essentially transmitted by one rubber segment only.

It has turned out that three or a larger uneven number of spring elements is advantageous in order to achieve constant velocity. If the hub members engage into the spring elements on both sides (floating joint member), the number of elements has to be doubled. The joint, in accordance with the invention, is suitable for high speeds (up to 8000 rpm) as the fluid has a centering effect. The joint also has emergency running properties which come into effect in cases of leakages.

In a preferred embodiment of the invention, the throttling means or flow resistances are designed as narrowed cross-sections of the channels connecting the chambers. The extent to which the cross-section is narrowed or the amount of free channel cross-section remaining is determined by tests when an actual vibration problem occurs. For instance, if radial vibrations occur in the driveline of a passenger car, the first step is to determine the cross-sectional area which has the maximum vibration damping effect by using a joint in accordance with the invention with adjustable resistance means such as rotary slides. The cross-sectional area determined in this way is then used as a basis for mass producing the joint incorporated into this driveline. Naturally, resistance cannot only be achieved by narrowing the cross-sections of the channels, especially at the meeting point of the channels converging in a starlike manner, but on the basis of the cross-sectional area determined for achieving an optimum damping effect, the complete channels may be designed to be narrower so that there will be no need for actual throttles, nozzles, diaphragms or slides. Furthermore, the damping effect may be varied considerably via the viscosity of the medium, e.g., glycols or silicon fluid. A design where the channels and chambers have their own pronounced fluid dynamics (fluid resonance) also forms part of the invention.

According to a further embodiment of the invention, the throttling or resistance means is a cylindrical recess with a rotary slide which has been provided with bores which are associated with the channels of both systems and which converge in a starlike way. By means of the rotary slide, reduction in the two chamber-channel systems may be adjusted simultaneously so as to be infinitely variable between the completely open and completely closed channel cross-section. In this way, it is possible to influence spring stiffness and damping of radial and rotational vibrations as well as angular errors. The lowest radial stiffness and the lowest amount of damping of radial and torsional vibrations occur if the cross-section is almost completely closed. If the cross-section of the throttle opening is changed, a change occurs in the dynamic radial stiffness of the joint which, in view of the relation between the speed of flow and the fluid friction, is speed dependent. At the same time, if there is an active exchange of fluid, the damping effect increases because of the narrowed cross-section. If the rotary slide is closed completely, the static radial stiffness increases whereas the damping effect decreases. Fluid damping is then due exclusively to fluid vibrations (whirling) within the chambers. If the connecting channels are open and if there is a radial offset, fluid is exchanged between the connected chambers. If this exchange of fluid is stopped by closing the rotary slide and if there is a radial offset, additional deformation of the elastic sealing walls becomes necessary, the effect of which is a stiffening of the joint.

In a further embodiment of the invention, provision has been made for cylindrical recesses extending from each of the two end faces of the joint members inwardly through a meeting point having rotary slides rotatable inside them and being provided with bores which are associated with the channels and which converge starlike. This design of separate rotary slides permits an independent adjustment of the damping effect in the two chamber-channel systems.

Preferably the meeting points of both chamber-channel systems and the rotary slide axis are positioned on the axis of the joint member. The centric arrangement of the systems in the joint member results in the fluid being dampened in a uniform way.

In the preferred embodiment of the invention, the starlike converging channels extend from the surface of the joint member essentially radially to the meeting point and are closed at the surface end by screws or plugs. Producing the radial channels does not cause any difficulties. By screwing in the screws or pushing in the plugs, the fluid contained in the chamber-channel systems may be placed under excess pressure.

If only one hub member is attached to the formed rubber-metal parts of the joint member (and if the other hub member is attached directly to the joint member), one channel of each chamber-channel system connected to a chamber extends in each spoke of the joint member. If a joint member has three inserted formed rubber-metal parts, the system consequently comprises three chambers and three channels guided from the chambers to the central meeting points.

If both hub members or flanges are attached to the formed rubber-metal parts, i.e., with a floating joint member design, the channels of a chamber-channel system which are connected to two oppositely arranged chambers are provided only in every second spoke of the joint member. With this embodiment, the number of formed rubber-metal elements has been doubled so that, for example, three elements have been connected to the hub at the input end and three to the hub at the output end. This design permits a larger joint angle and the use of the joint as a vibration eliminator (torsional and bending vibrations).

Furthermore, the chambers may be provided with a rubber-elastic or rigid metallic stop. Such stops limit the maximum angle of torsion of the joint, and the maximum transmittable torque is therefore increased.

Preferably the ridge walls between the chambers formed in the recesses extend essentially radially relative to the joint axis, in which case, the stiffness and damping percentage resulting from the fluid becomes effective in respect of torsional resilience and damping as well as radial resilience and damping. As far as axial and angular offsets are concerned, there are few or hardly any fluid-related damping effects and, therefore, very few losses. If damping by fluid is required in the direction of axial and angular offsets as well, at least one rubber-metal element has to be twisted so that its ridge wall no longer extends radially in the joint member, but forms an angle with the radius of the joint member. The different alignments of the rubber-metal parts induce fluid flows which may be used for damping purposes in the case of the offset mentioned.

In a special embodiment of the shaft joint or coupling, the joint member is made of fiber reinforced resin, especially of polyester resin reinforced by glass fibers, glass fiber strip or glass fiber fabric inserts. In contrast to joint members made of metal, such as aluminum alloys, the joint member made of artifical resin, because of the nature of the material, improves damping and elasticity of the joint. The damping effects on this joint therefore originate from the rubber material, the flowing fluid medium and the spring elements surrounding the joint member. Production of the joint member may be simplified by casting the reinforced artificial resin around the formed rubber-metal parts contained in sleeves. The reinforcing strips or inserts are preferably placed around the spring elements alternately so that a composite reinforcing system is achieved between the elements.

The invention also relates to a propeller shaft assembly comprising a hollow shaft consisting of a glass fiber composite or carbon fiber composite, into each end of which shaft assembly, a shaft joint in accordance with the invention is inserted. Preferably, shaft joints having joint members made of fiber reinforced artificial resin are glued into the hollow shaft. The resin used for the fiber composite may be polyester resin, for example.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DESCRIPTION OF THE DRAWINGS

In the drawings:

FIG. 17 is a sectional view showing a propeller shaft assembly incorporating shaft couplings in accordance with the invention.

DETAILED DESCRIPTION OF THE PREFERRED EMBODIMENTS

Figure 1:
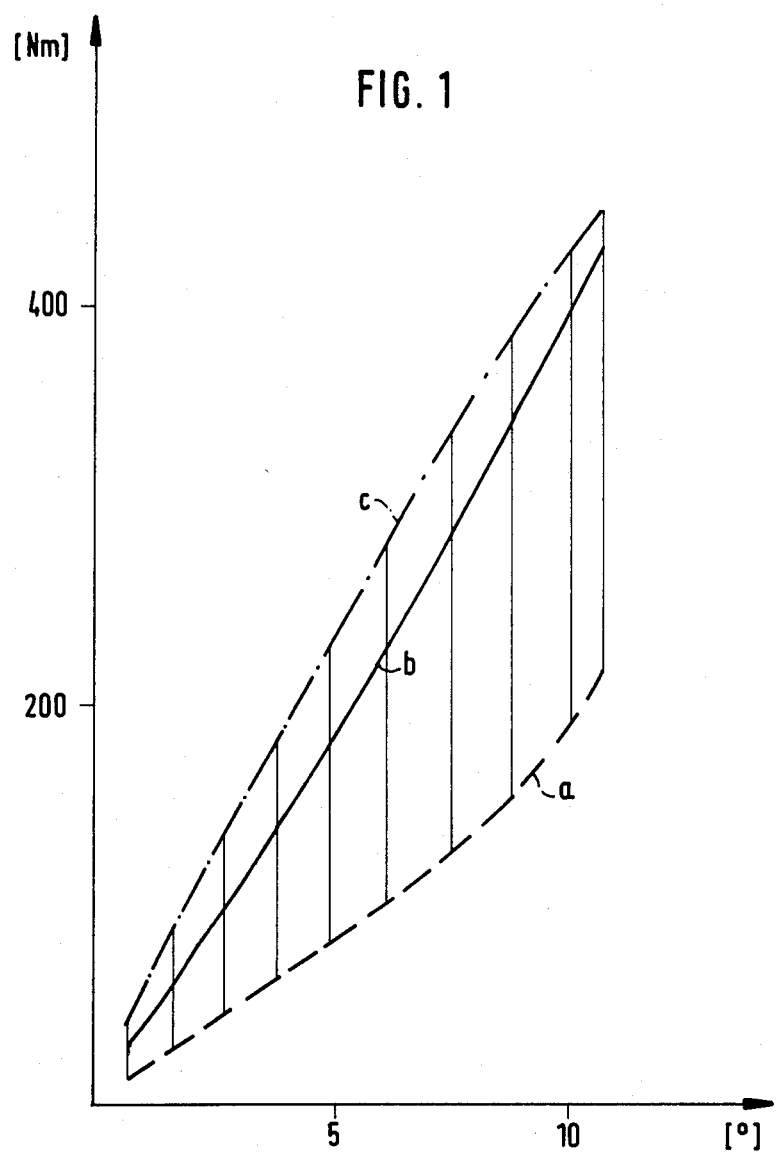
FIG. 1 is a graph of the characteristic curve of the joint in accordance with the invention indicating the different variations that are possible.
Figure 2:
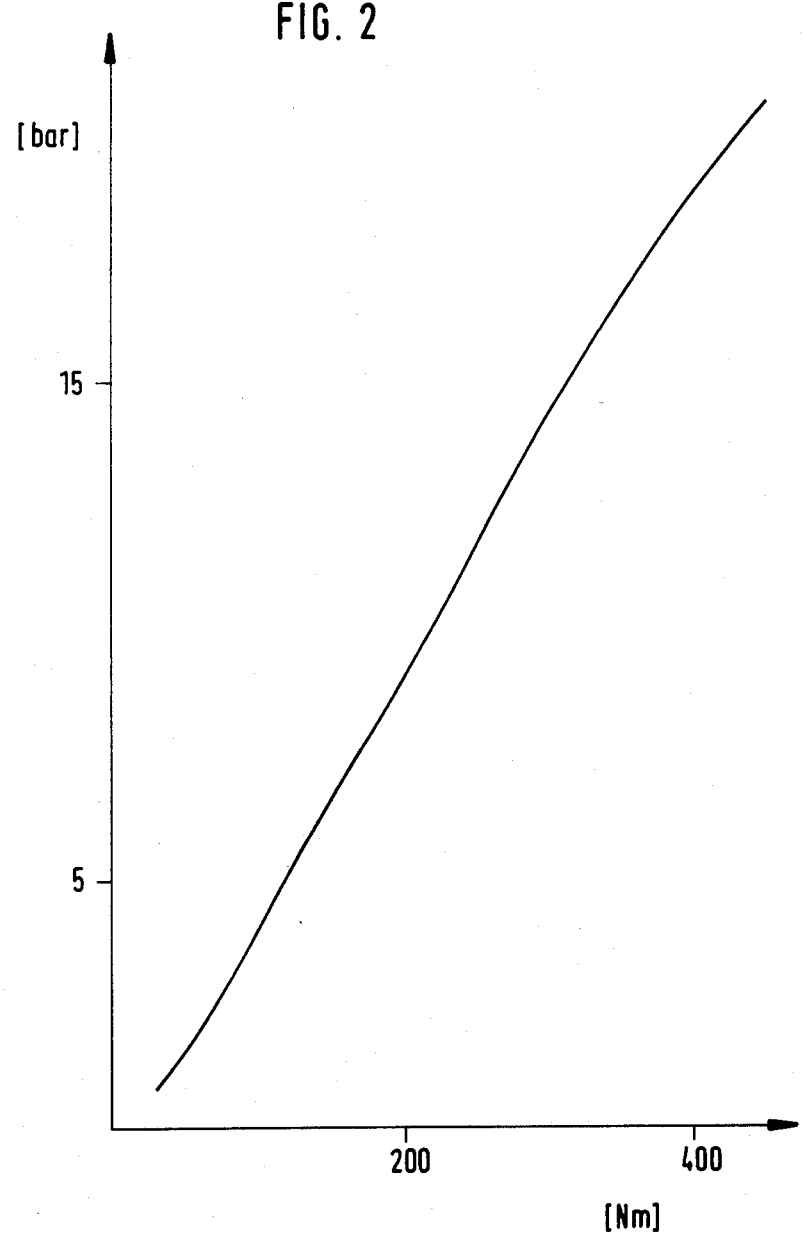
FIG. 2 is a graphic illustration of the chamber pressure as a function of the torque transferred in the case of the joint in accordance with the invention.
Figure 3:
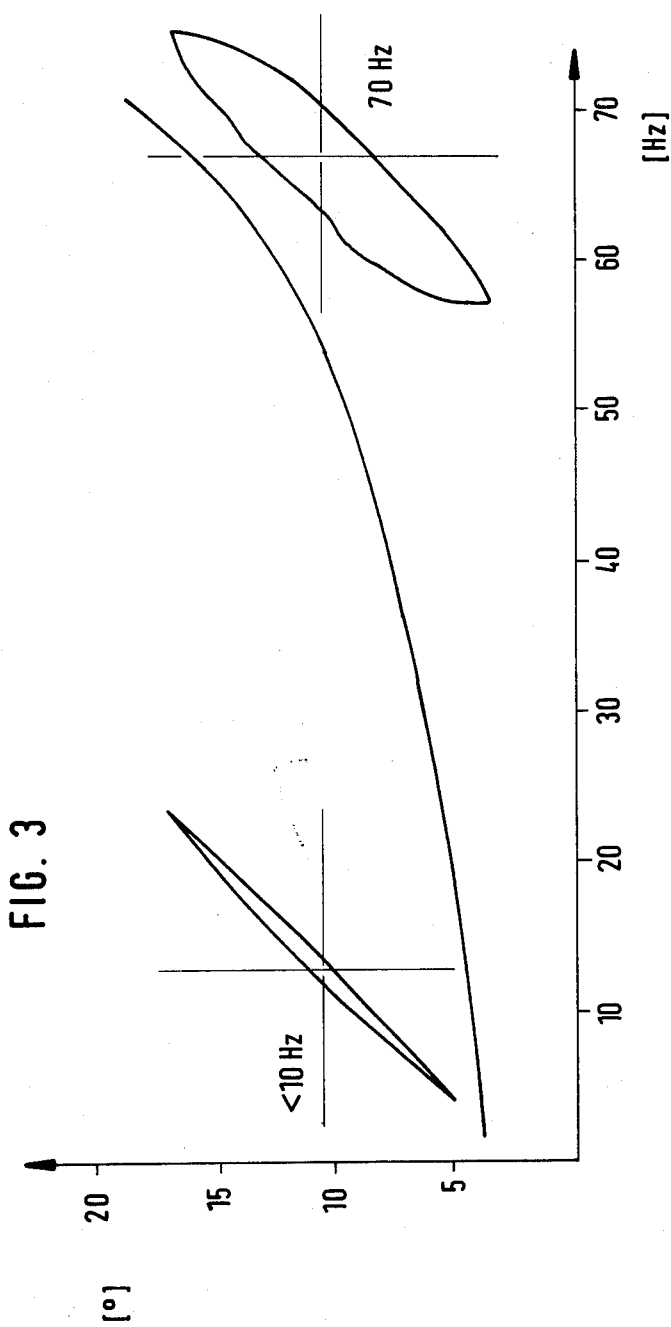
FIG. 3 is a graphic illustration of the damping of the joint in accordance with the invention as a function of the exciter frequency.

FIGS. 1, 2 and 3 illustrate various performance characteristics of the shaft coupling in accordance with the invention. However, before these figures are discussed, the physical embodiments of the invention will first be described and FIGS. 1, 2 and 3 will be referred to hereinafter.

Figure 4:
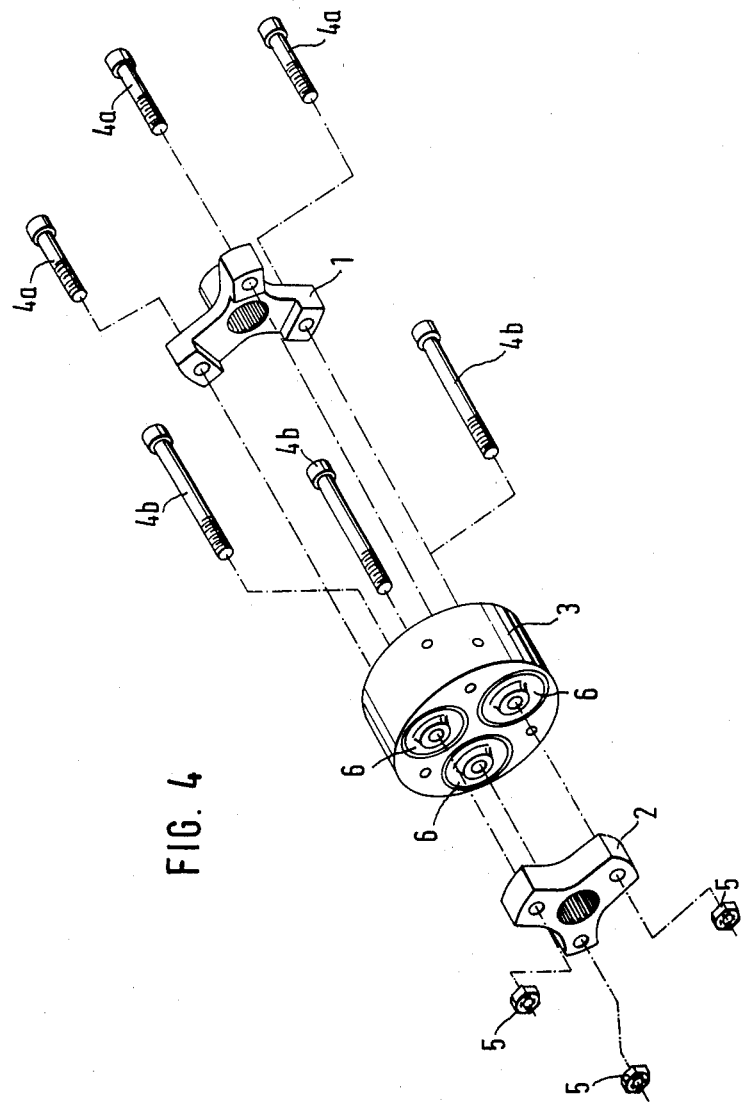
FIG. 4 depicts a first embodiment of the joint in accordance with the invention shown in an exploded view.
Figure 5:
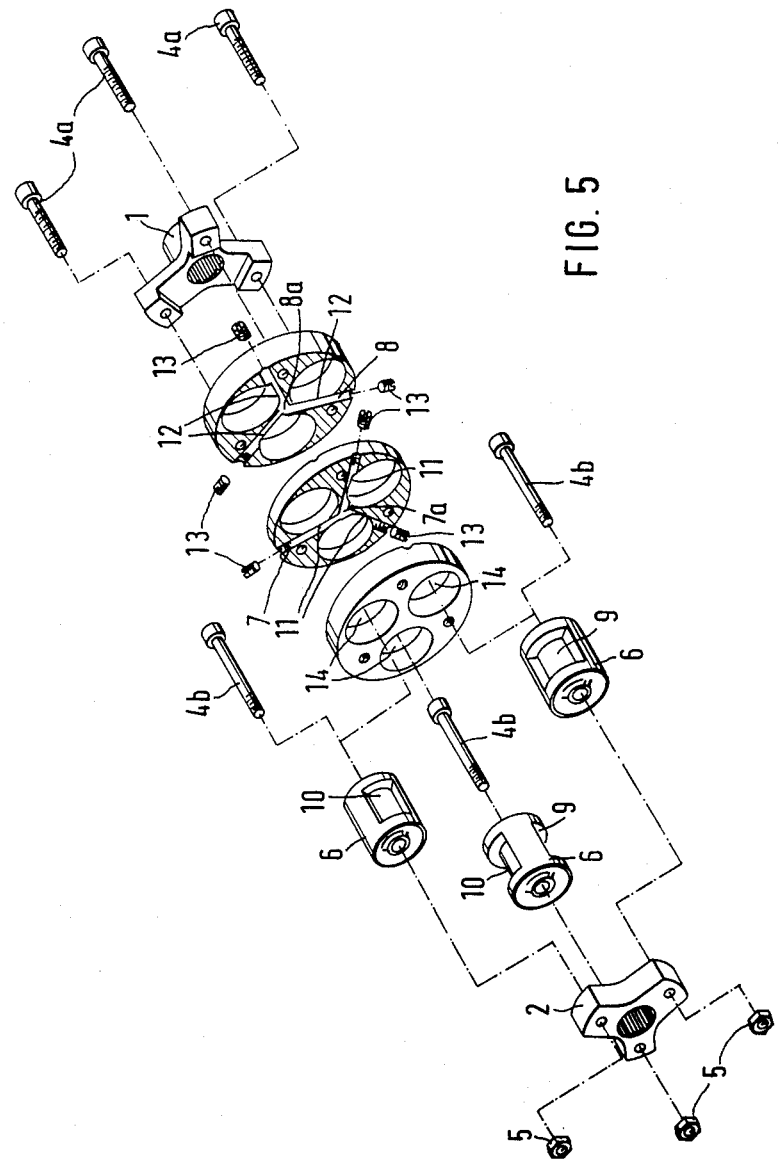
FIG. 5 is an exploded illustration similar to that of FIG. 4, the difference being that the rubber-metal elements are separated from the joint member which has been cut for the purpose of illustration.

A first embodiment of the invention is shown in FIGS. 4 and 5. The joint illustrated in FIGS. 4 and 5 consists essentially of a hub member 1 defining the torque input end of the joint, a cylindrical joint member 3 and a hub member 2 at the output end. The joint member 3 has three cylindrical recesses 14 which extend along its entire length and into which three rubber-metal elements 6 are firmly pressed. When the joint is fully assembled, the hub member 1 at the input end is directly screwed to the joint member 3 by screws 4a, whereas the hub member 2 at the output end is screwed to the inserted rubber-metal elements 6 by screws 4b and nuts 5.

FIG. 5 shows that the cylindrical rubber-metal elements 6 are provided with two axially symmetric recesses which, after insertion of the elements 6 into the recesses 14, form the fluid chambers 9 and 10. To illustrate the arrangement of channels in the joint member 3, the latter, in FIG. 5, is shown cut along the two channel planes and drawn apart. It can been seen that, in both cross-sectional planes, essentially radial bores 7 and 8 are guided from the surface of the joint member 3 through the three spokes to a common meeting or convergence point positioned on the joint member axis. Each of the channel bores 7, 8 grazes one of the recesses 14, forming the apertures 11 and 12. When the rubber-metal elements 6 are inserted into the recesses 14, the channel bores 7 are connected to the chambers 9 via the apertures 11 and the channel bores 8 are connected to the chambers 10 via the apertures 12.

At the surface end, all channel bores 7, 8 are closely sealed by screws 13. Consequently, the joint member 3 contains two chamber-channel systems 7, 9 and 8, 10 which, in respect of the flow of fluid, are completely separate from one another and which, when the joint is ready for operation, are filled with a fluid, e.g., glycol or silicon fluid. Therefore, in accordance with the pressure fluctuations occurring in the chambers 9, 10, the fluid may pulsate within the systems but not between the systems. In this embodiment, the channels 7, 8 are dimensioned in respect of their inside width in such a way that a specific predetermined throttling of the fluid pulsations and thus the damping effect required for a specific application is achieved.

Figure 6:
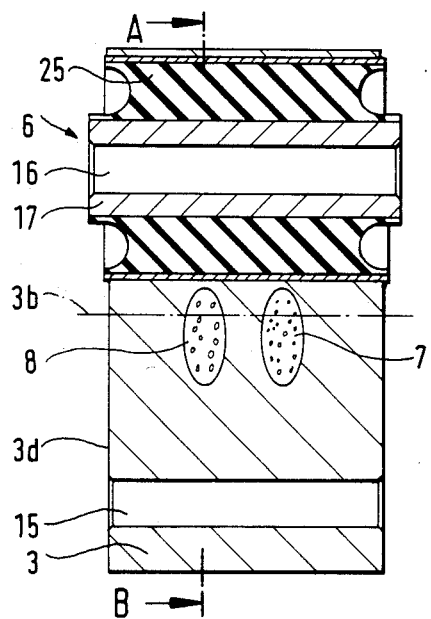
FIG. 6 is an axial section of the joint member shown in FIG. 4 on an enlarged scale.
Figure 7:
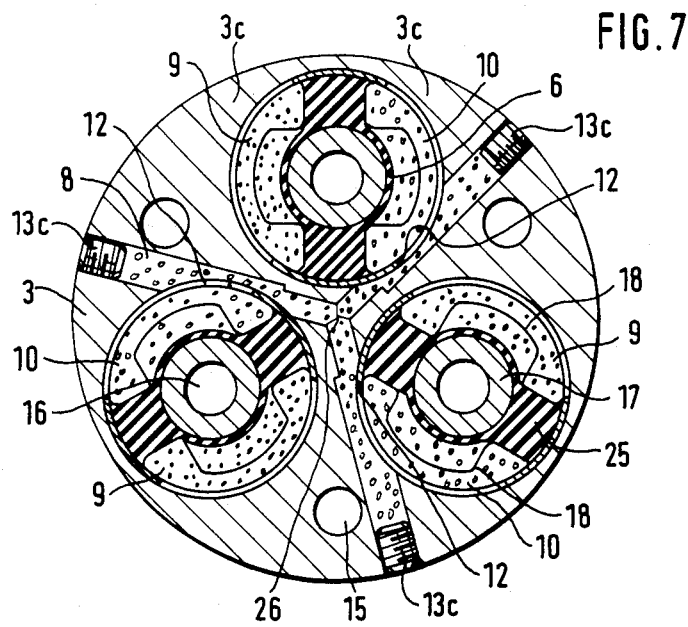
FIG. 7 is a cross-section of the joint member along line A-B of FIG. 6.

Another embodiment of the joint member in accordance with the invention is shown in FIGS. 6 and 7 wherein the rubber-metal elements 6 have each been provided essentially with a transmitting sleeve 17 and two vulcanized diametrically opposed ridge walls 25 by which the chambers 9, 10 are separated. In this embodiment, the sleeves 17 serve to fix the hub member 2 at the output end which is screwed to the rubber-metal element 6 by means of the bolts 4b passing through the bores 16 of the sleeves 17 and the nuts 5. In a position diametrically opposed relative to the sleeves 17, provision has been made in the joint member 3 for three bores 15 which serve to fit the hub member 1 at the input end by means of bolts 4a to the joint member. Under the effect of torque, the rubber ridges 25 and the fluid fillings in the chambers 9, 10 permit a displacement of the transmitting sleeves 17 in the circumferential direction, in the course of which one chamber of each element is reduced in size and the size of the other chamber increases, and the pressure of the medium contained therein increases and decreases respectively. To limit such deformations, the chambers 9, 10 have been provided with stops 18.

In the embodiment shown in FIG. 7, the throttle has been designed as a central narrowed cross-section 26 for all three radial channels 8. The channels 7 extending in a plane which is parallel to the illustrated plane have been provided with narrowed cross-sections in the region of their meeting point in the same way.

Figure 8:
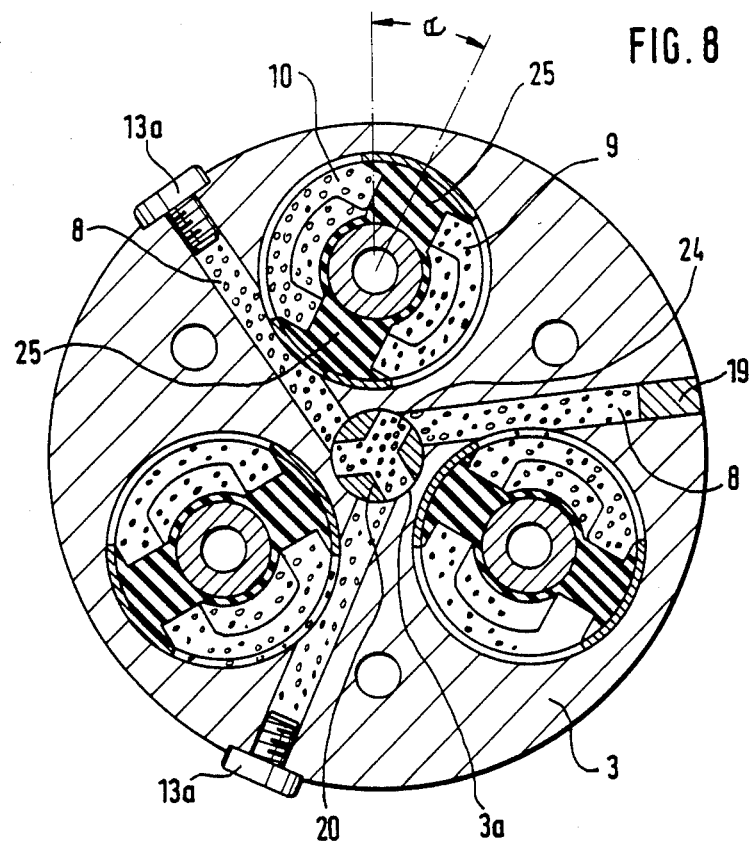
FIG. 8 is a cross-section of a second embodiment of the joint member having a rotary slide.

Another embodiment of the invention shown in FIG. 8 differs essentially from the embodiment shown in FIG. 7 in that, instead of the constant central throttle, provision has been made for a central rotary slide 20 having bores 24 corresponding to the channels 8 and bores 23 corresponding to the channels 7. The rotary slide 20 permits flow resistance in the two chamber-channel systems 8, 10 and 7, 9 to be adjusted so as to be infinitely variable and, at the same time, the cross-sectional narrowing required to achieve maximum damping may be selected. Furthermore, FIG. 8 shows that the rubber-metal element 6 is twisted by the angle α relative to radial alignment. This twist ensures that even with an axial and angular offset the fluid has a damping effect. To close the channels 8, this embodiment has been provided with sealing screws 13a and sealing plugs 19 which may be glued or wedged in.

Figure 9:
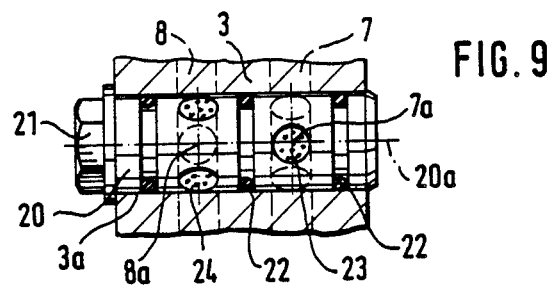
FIG. 9 is an axial view of the rotary slide used for the joint member design as illustrated in FIG. 8.

FIG. 9 shows an axial section of the rotary slide 20 which has been provided with the bores 23 converging in the meeting point 7a and in a position axially offset relative to the bores 23, bores 24 converging in the meeting point 8a. The channels/bores 7, 23 and 8, 24 are sealed by sealing rings 22 relative to each other and to the outside so that separation of the two systems is not adversely affected by the rotary slide 20 and leakages are avoided. The rotary slide 20 inserted into the bores 3a of the joint member 3 carries a hexagonal head 21 by means of which the rotary slide 20 may be adjusted.

Figure 10:
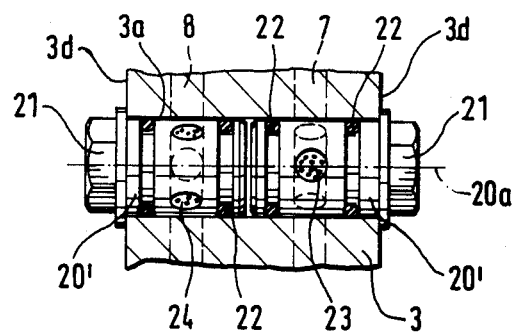
FIG. 10 is an axial view similar to FIG. 9, but it shows two separate rotary slides.

In another embodiment, according to FIG. 10, instead of the rotary slide 20, there are provided two separate rotary slides 20' which are inserted into the bore 3a so that the two systems may be throttled independently of each other, thereby permitting damping to be adjusted differently in the two directions of rotation.

Figure 11:
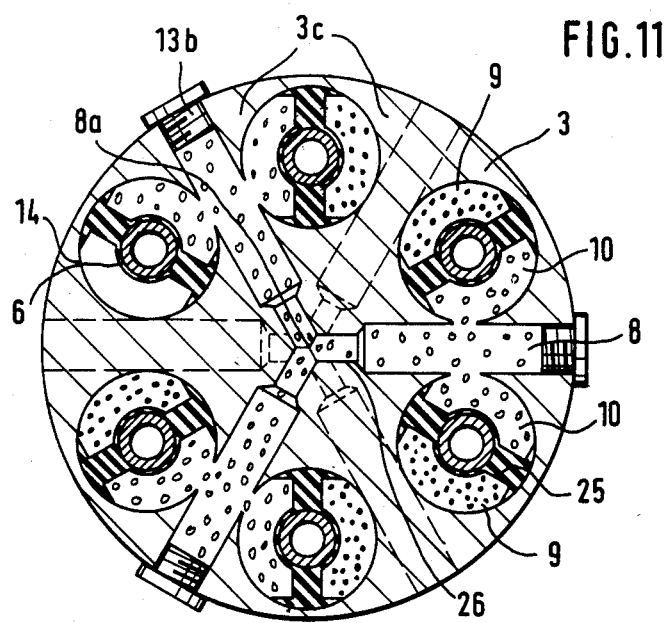
FIG. 11 is a cross-section of a third embodiment of the joint member designed for a floating attachment between the hub members.

A further embodiment according to the invention is shown in FIG. 11 wherein the joint member 3 has been provided with six rubber-metal elements 6 in the recesses 14. Three elements 6 are alternately connected to the hub member at the input end and three elements 6 to the hub member at the output end. In accordance with the pressure loading of the chambers occurring during the transmission of torque, the three channels 8 are connected to two adjoining chambers 10. In the vicinity of the meeting point 8a, again a narrowed cross-section 26 has been provided which produces the desired damping effect. Analogously to channels 8, channels 7 (broken line) have been arranged in the three other spokes 3c in a plane axially offset relative to the drawing plane and extend to the six chambers 9, thereby, together with these, forming the second chamber-channel system.

Figure 12:
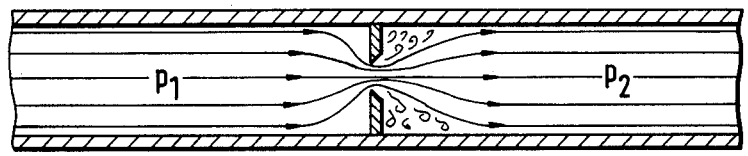
FIGS. 12-16 are axial sections illustrating, respectively, different embodiments of flow resistance elements affecting damping.
Figure 13:
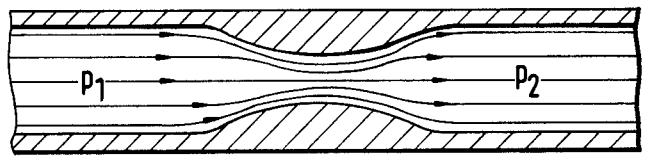
Figure 14:
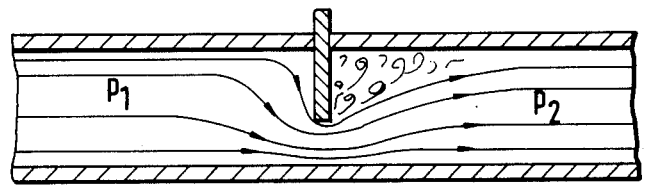
Figure 15:
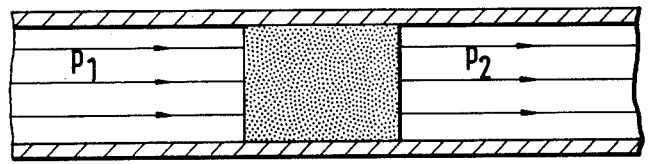
Figure 16:
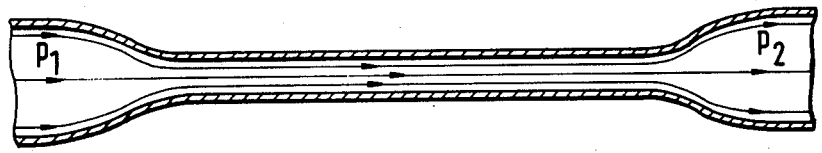

FIGS. 12 to 16 show different embodiments with the channels 7, 8 having different narrowed cross-sections through which the required flow resistances may be achieved. FIG. 12 shows a diaphragm, FIG. 13 a nozzle, FIG. 14 a valve-like cross-sectional narrowing such as it may be realized by the rotary slide. In FIG. 15, the cross-section is narrowed by a porous plug arranged in the channel. Finally, FIG. 16 illustrates a long narrowed channel which also results in an increased flow resistance. Furthermore, as mentioned above, the damping effect may be influenced by the viscosity of the fluid. Fluids with very different viscosities are water, glycol and silicon fluid.

According to FIG. 17, a propeller shaft assembly incorporating the invention consists of a hollow shaft 29 which is widened at each end and into whose ends the shaft joints according to the invention have been glued. The hollow shaft 29, for example, consists of artificial resin reinforced with glass fibers or carbon fibers. In the embodiment shown, the joint members 30 consist of polyester resin reinforced by a glass fiber strip. In the way described above, the joint members 30 surround the rubber-metal elements 33 contained in metal sleeves, with the transmitting bolts 27 at the input end and the transmitting bolts 28 at the output end, with FIG. 17 showing only one of each. In both joints, the chamber-channel systems are designed as described above, with the channel 31 belonging to the one chamber-channel system and the channel 32 to the other chamber-channel system of a joint.

Referring now back to FIGS. 1, 2 and 3, it will be seen that various characteristics of the invention may be advantageously provided.

FIG. 1 is a curve showing torque as a function of the angle of torsion. FIG. 1 illustrates the possibilities for varying the characteristic curves of torsion of the joint in accordance with the invention by modifying the fluid contained in the joint member. Curve b applies to the joint whose chamber-channel systems are completely filled with fluid being under a pressure of 1 bar. If the systems contain small inclusions of air, the curve becomes softer, i.e., it moves into the region below the curve b into the direction of curve a of the joint not containing any fluid. If, on the other hand, fluid is pressed into the chamber-channel systems under pressure, the joint becomes harder, i.e., with an increasing fluid pressure, the curve moves from curve b towards curve c.

FIG. 2 shows the curve of the fluid pressure in the pressure-loaded system as a function of the torque transmitted by a certain joint in accordance with the invention. Measurements have shown that torque of 400 Nm corresponds to chamber pressure of approximately 20 bar.

FIG. 3 shows the dependence of the damping effects in the joint, expressed as the phase angle, on the exciter frequency. The illustration shows that with an increasing frequency, damping increases overproportionally. This increase is largely due to the growing percentage of damping undertaken by the fluid, as the percentage of rubber changes only insignificantly in the frequency range in question. The illustration contains two hysteresis loops determined in tests at less than 10 Hz and at 70 Hz. At the lower frequency rate, damping is determined exclusively by the rubber. The fluid escapes completely and does not make any contribution towards damping. At 70 Hz, however, the hysteresis loop is very much wider. The increase in damping is due largely to the effect of the fluid which now comes into action.

Thus, from the foregoing, it will be seen that the invention provides a homokinetic, elastic shaft joint coupling capable of compensating for axial, radial, angular and/or torsional shaft offset. In addition, the shaft joint should make it possible to damp vibrations in an axial, radial, angular and torsional direction and to adjust the stiffness, i.e., the characteristic curve $M_d = f(\phi)$ ($M_d$=torque, $\phi$=angle of torsion) anywhere within limits. The overall object is that the joint should provide the possibility of optimum adjustment to the existing vibration system and in particular to the vibration behavior of a driveline. Finally, it is proposed to provide a propeller shaft which incorporates these joints.

The objective is achieved essentially in that the chambers which are under pressure when torque is transmitted are connected by channels converging starlike in a meeting point, that the chambers under tension when torque is transmitted are connected by channels which are axially offset relative to the channels converging in the first meeting point and which converge in a second meeting point and that the channels of the two chamber-channel systems essentially filled with a medium (e.g., a fluid) are designed at least partially as resistance means against the flow of media, e.g., the flow of a liquid.

While specific embodiments of the invention have been shown and described in detail to illustrate the application of the inventive principles, it will be understood that the invention may be embodied otherwise without departing from such principles.

What is claimed is:

1. An elastic constant velocity torque transmitting coupling including a first hub member, a second hub member and a joint assembly elastically joining said first and second hub members in torque transmitting engagement, said joint assembly comprising:
   a first and a second fluid system each containing a fluid medium which is adapted to be placed under pressure during torque transmission between said first and second hub members;
   said first fluid system including a first plurality of individual fluid chambers and a first plurality of channels connecting said first plurality of chambers in flow communication;
   said second fluid system including a second plurality of individual fluid chambers and a second plurality of channels connecting said second plurality of chambers in flow communication;
   said first and said second plurality of channels being axially offset relative to each other and extending outwardly, respectively, from a first and a second common point at which said first and second plurality of channels, respectively, are placed in flow communication with each other; and
   throttling means in each of said first and second fluid systems resisting the flow of fluid media therein;
   said joint assembly comprising a generally cylindrical body member defining a central axis and having a plurality of axially extending bores therein with a plurality of inserts being arranged one within each of said bores, said first and second plurality of fluid chambers being defined between said inserts and the inner surface of said bores and said first and second plurality of channels being defined to extend through said cylindrical body member radially relative to said central axis.

2. A coupling according to claim 1, wherein said throttling means comprise means narrowing the cross-sectional areas of said channels.

3. A coupling according to claim 1, wherein said throttling means comprise rotary slide means located at each of said first and second common points including bores through which said fluid media may pass, said rotary slide means being rotatable to adjust the flow resistance in each of said first and said second fluid systems.

4. A coupling according to claim 1, wherein said joint assembly is formed with a generally cylindrical configuration having a central axis extending in the direction of torque transmission between said first and second hub members, said joint assembly being further provided with a cylindrical recess extending centrally therethrough in the direction of said central axis with said first and second plurality of channels extending radially outwardly from said central axis in flow communication with said cylindrical recess, said throttling means comprising a rotary slide member rotatably contained within said cylindrical recess and having bores adapted to place said first and second plurality of channels, respectively, in flow communication with each other in order to enable adjustment of the flow resistance within each of said first and second fluid systems by rotation of said rotary slide member.

5. A coupling according to claim 4, wherein said rotary slide member is formed as a single unitary cylindrical member.

6. A coupling according to claim 4, wherein said rotary slide member is formed in two parts each separately rotatably adjustable and each arranged for cooperation individually with said first and second fluid systems to enable adjustment individually of the flow resistance in each.

7. A coupling according to claim 1, wherein said joint assembly is formed with a generally cylindrical configuration defining a central axis extending in the direction of torque transmission between said first and second hub members and wherein said first and second common points are positioned along said axis.

8. A coupling according to claim 7, wherein said first and second plurality of channels extend from the surface of said joint assembly essentially radially relative to said axis to said first and second common points, with closure means being provided at the surface of said joint assembly sealing said first and second plurality of channels.

9. A coupling according to claim 1, wherein each of said inserts includes means for attaching one of said first and second hub members thereto.

10. A coupling according to claim 9, wherein said first hub member is attached to said inserts and said second hub member is attached to said cylindrical body member.

11. A coupling according to claim 9, wherein said first and said second hub members are attached to said inserts, said first hub member being attached to different inserts than said second hub member.

12. A coupling according to claim 11, wherein the channels of said first plurality of channels are arranged angularly offset relative to the channels of said second plurality of channels as viewed in the axial direction of said cylindrical body member.

13. A coupling according to claim 1, wherein said inserts are formed to comprise metallic material and resilient material.

14. A coupling according to claim 1, wherein each of said first and second plurality of channels are arranged in flow communication with one only of said first and second plurality of fluid chambers.

15. A coupling according to claim 1, wherein each of said first and second plurality of channels is arranged in flow communication with more than one of said first and second plurality of fluid chambers.

16. A coupling according to claim 1, wherein said inserts are formed with a central metallic sleeve and with a web member formed of resilient material, said web member being comprised of a central cylindrical portion engaged about said metallic sleeve and radial webs extending outwardly therefrom.

17. A coupling according to claim 1, wherein said inserts are rotatably movable within said bores to effect compression of said fluid media within said chambers during torque transmission, said coupling further comprising stop means within said chambers for limiting the extent of relative movement between said inserts and the walls of said bores in said cylindrical body member.

18. A coupling according to claim 1, wherein said joint assembly is formed to comprise fiber reinforced artificial resin material.

19. A coupling according to claim 1, wherein said joint assembly is formed to comprise polyester resin reinforced material, said material being reinforced by one of glass fibers, glass fiber strip and fabric inserts.

20. A coupling according to claim 1, wherein said throttling means comprise a diaphragm formed within said channels defining a flow restricting orifice.

21. A coupling according to claim 1, wherein said throttling means are formed by shaping said channels to define therein a nozzle constricting the fluid flow area through said channels.

22. A coupling according to claim 1, wherein said throttling means comprise a valve body member extending into said channels to restrict the flow area therein.

23. A coupling according to claim 1, wherein said throttling means comprise a porous plug provided within said channels.

24. A coupling according to claim 1, wherein said fluid medium consists of one of water, glycol and silicon fluid.

25. An elastic constant velocity torque transmitting coupling including a pair of hub members and a joint assembly elastically joining said hub members for torque transmitting engagement therebetween, said joint assembly comprising:
a joint member defining therein at least three recesses;
a formed rubber metal part firmly fitted in each of said recesses so as to define two separate chambers in each recess;
channels defined in said joint member for connecting said chambers together;
one of said hub members being attached to said joint member and the other of said hub members being attached to said formed rubber metal parts;
with a first group of said chambers being under pressure when said coupling is transmitting torque in one direction and with a second group of said chambers being under pressure when said coupling is transmitting torque in an opposite direction;
said first group of chambers being connected together by a first group of said channels which converge radially at a first meeting point and said second group of chambers being connected together by a second group of said channels which converge at a second meeting point;
said first group of channels being located axially offset from said second group of channels with each of said first and second group of channels including throttling means to provide a throttling effect to fluid flow therethrough;
said chambers being designed as cylindrical recesses of bores extending across the entire length of said joint member with said channels being formed as straight bores extending from a peripheral surface of said joint members essentially radially to said respective meeting points located on an axis of said joint members so as to partially penetrate said cylindrical recesses.

* * * * *